(12) United States Patent
Kratzer

(10) Patent No.: US 8,448,916 B2
(45) Date of Patent: May 28, 2013

(54) SOLENOID VALVE FOR CONTROLLING A FLUID

(75) Inventor: Dietmar Kratzer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 278 days.

(21) Appl. No.: 13/032,515

(22) Filed: Feb. 22, 2011

(65) Prior Publication Data
US 2011/0204272 A1   Aug. 25, 2011

(30) Foreign Application Priority Data

Feb. 23, 2010   (DE) .......................... 10 2010 002 229

(51) Int. Cl.
*F16K 31/06* (2006.01)

(52) U.S. Cl.
USPC ................. 251/129.18; 251/337; 335/258

(58) Field of Classification Search
USPC ............... 251/129.15, 129.18, 337; 335/258
See application file for complete search history.

(56) References Cited

U.S. PATENT DOCUMENTS

| | | | | |
|---|---|---|---|---|
| 5,467,961 A | * | 11/1995 | Sausner et al. ........... | 251/129.15 |
| 5,503,366 A | * | 4/1996 | Zabeck et al. ................ | 335/258 |
| 6,050,542 A | * | 4/2000 | Johnson et al. .......... | 251/129.15 |
| 6,279,873 B1 | * | 8/2001 | Eichendorf et al. ...... | 251/129.19 |
| 6,409,145 B1 | * | 6/2002 | Fong et al. .................... | 251/337 |
| 6,837,478 B1 | * | 1/2005 | Goossens et al. ............ | 251/337 |
| 6,938,875 B2 | * | 9/2005 | Ichinose et al. .......... | 251/129.18 |
| 6,953,183 B2 | * | 10/2005 | Uryu et al. ............... | 251/129.08 |
| 7,163,188 B1 | * | 1/2007 | Sisk ......................... | 251/129.19 |
| 7,350,763 B2 | * | 4/2008 | Hofling .................... | 251/129.15 |
| 7,458,395 B2 | * | 12/2008 | Haynes et al. ............ | 137/625.65 |
| 7,744,062 B2 | * | 6/2010 | Dalluge ........................ | 251/337 |
| 2003/0131651 A1 | | 7/2003 | Solet et al. | |
| 2009/0026396 A1 | * | 1/2009 | Moenkhaus et al. ...... | 251/129.02 |

FOREIGN PATENT DOCUMENTS

DE   10 2007 031 981   1/2009

* cited by examiner

*Primary Examiner* — John Bastianelli
(74) *Attorney, Agent, or Firm* — Maginot, Moore & Beck

(57) ABSTRACT

A solenoid valve for controlling a fluid is disclosed. The solenoid includes an armature, a pole core, wherein a working gap is provided between the armature and the pole core, a valve member which is connected to the armature and can be moved together with the armature, a valve body with a through-opening on which a valve seat is formed, wherein the valve member opens and closes the through-opening on the valve seat, a return element which applies a return force to the valve member in order to return the valve member to a closed state, a spring element which is arranged in the working gap, and an adjusting device which is arranged on the armature and which is in contact with the spring element in order to adjust a spring force of the spring element.

10 Claims, 3 Drawing Sheets

SOLENOID VALVE FOR CONTROLLING A FLUID

Cross Reference is made to copending U.S. patent application Ser. No. 13/032,503, entitled "Solenoid Valve for Controlling a Fluid," filed on Feb. 22, 2011.

This application claims priority under 35 U.S.C. §119 to German patent application no. 10 2010 002 229.2, filed Feb. 23, 2010 in Germany, the disclosure of which is incorporated herein by reference in its entirety.

The present disclosure relates to a solenoid valve which is closed in the de-energized state and has the purpose of controlling a fluid.

BACKGROUND

Solenoid valves which are closed in the de-energized state and have the purpose of controlling a fluid are known from the prior art in various embodiments, in particular, for example, as outlet valves for ABS/TCS/ESP devices in motor vehicles. These solenoid valves have a valve member which is connected to the armature and the pole core. A return element is provided between the pole core and the armature. The valve member opens a through-opening on a valve seat, and respectively closes it again. Such a valve element is known, for example, from DE 10 2007 031 981 A1.

SUMMARY

The solenoid valve for controlling a fluid with the features of the present disclosure has, in contrast, the advantage that a displaceable adjusting device for supporting an additional spring element is inserted on the armature, in order to adjust the force effect of the spring element in its interaction with the return element. This is achieved according to the disclosure in that the solenoid valve for controlling a fluid comprises an armature, a pole core, wherein a working gap is provided between the armature and the pole core, and a valve member which is connected to the armature and can be moved together with the armature. The solenoid valve also has a valve body with a through-opening on which a valve seat is formed, wherein the valve member opens and closes the through-opening on the valve seat, a return element which applies a return force to the valve member in order to return the valve member to a closed state, and the spring element which is arranged in the working gap. Furthermore, an adjusting device is provided, which is arranged on the armature and which is in contact with the spring element in order to adjust a spring force of the spring element. The adjustment of the spring force of the spring element makes it possible, when the solenoid valve is actuated, to counteract the magnetic force which increases exponentially as the axial working gap becomes smaller. This considerably improves the adjustability of the solenoid valve.

Preferred developments of the disclosure are set forth herein.

According to one preferred embodiment of the disclosure, the adjusting device comprises a circumferential adjusting ring which is arranged in an armature annular groove. This implements a simple and cost-effective adjusting device with a minimum number of components and a short mounting time, which adjusting device permits precise adjustment or calibration of the solenoid valve. In addition, the spring element can be made available as a cost-effective spring washer.

According to one preferred alternative, the adjusting device comprises a plurality of individual adjusting elements which are arranged in recesses in the armature. As a result of the spring element bearing on the plurality of individual adjusting elements it is possible to compensate fabrication tolerances or dimensional deviations of the spring washer. As a result, precise adjustment of the spring force can be carried out even when spring washers are used which are cost-effective, for example which are manufactured as punched parts.

In a further advantageous embodiment of the disclosure, the recesses are embodied as armature longitudinal grooves. As a result, recesses which are easy and cost-effective to manufacture can be made available for accommodating the adjusting elements, and with good accessibility for adjusting them during the mounting process.

According to one preferred embodiment of the disclosure, the armature longitudinal grooves run over the entire axial length of the armature. As a result, the armature longitudinal grooves can be manufactured precisely with low expenditure on fabrication, and can be equipped with adjusting elements in minimum cycle times.

In addition, as a result the adjusting device can be mounted from the opposite side of the armature.

In a further advantageous embodiment of the disclosure, a form fit is provided between the adjusting device and the armature. This ensures that the adjusting device is secured in an operationally reliable and simple fashion with expenditure on devices and tools which is minimized in terms of time and costs.

The spring element preferably has a central opening and bears with an internal circumference against an end side, facing the armature, of the pole core. Furthermore, the spring element bears with an external circumference against the adjusting device. As a result, a progressive spring force, which has the effect of closing the valve, can be brought about through elastic deformation of the spring element with the largest possible lever arms of the force effect, thereby achieving good adjustability of the spring force of the spring element.

According to one preferred embodiment of the disclosure, that end side of the pole core which faces the armature has a first undercut. In a further advantageous embodiment of the disclosure, that end side of the armature which faces the pole core has a second undercut. The free spaces required for the deformation of the spring element are made available thereby. Furthermore, the volume of the working gap is increased overall as a result of this, therefore significantly reducing disruption of the magnetic circuit of the solenoid valve. The undercuts are preferably formed with a tapering shape.

BRIEF DESCRIPTION OF THE DRAWINGS

Exemplary embodiments of the disclosure are described in detail below with reference to the accompanying drawing, in which.

DETAILED DESCRIPTION

A solenoid valve for controlling a fluid according to a first preferred embodiment of the disclosure will be described in detail below with reference to FIGS. 1 and 2.

Figure 1:
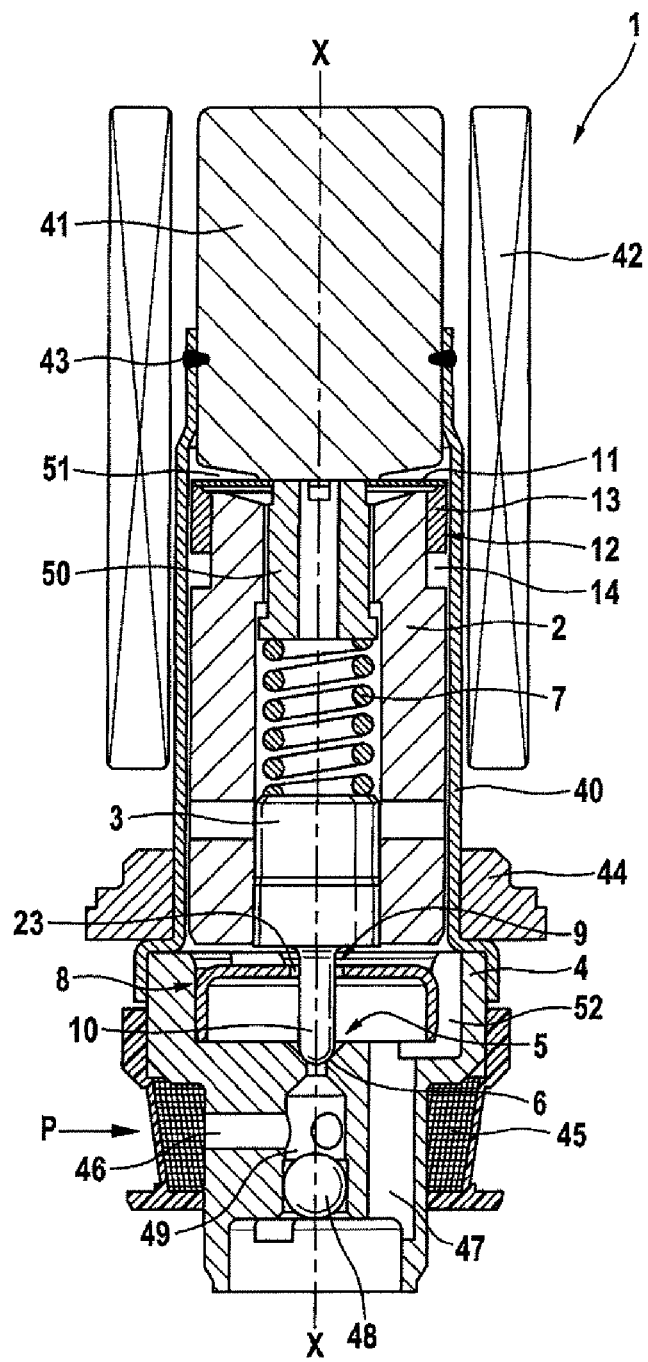
FIG. 1 is a schematic sectional illustration of a solenoid valve for controlling a fluid according to a first exemplary embodiment of the disclosure.

FIG. 1 shows a schematic sectional illustration of a solenoid valve 1 for controlling a fluid according to a first exemplary embodiment of the disclosure. The solenoid valve 1 comprises a housing 40, in the interior of which an armature 2, a valve member 3 and a valve body 4 which is connected to the housing 40 are arranged coaxially with respect to a central axis X. An armature assembly comprises the armature 2, the valve member 3, a return element 7 and a pressure element 50 which bears against an adjusting device 12, wherein a working gap 51 is formed between the armature 2 and the pole core 41. The pole core 41 is fastened to the housing 40 by means of a weld seam 43. When the solenoid valve 1 is actuated, the valve member 3 is moved in the direction of the central axis X toward the pole core 41, and when switching off occurs it is returned again to the home position by the return element 7.

As is also apparent from FIG. 1, a filter 45 is arranged on the outside of the valve body 4. A fluid, which is directed through the filter 45, flows through an inflow duct 46 formed perpendicularly with respect to the central axis X in the valve body 4, said fluid flowing in the direction of an arrow P and into a through-bore 49 formed coaxially with respect to the central axis X. In the valve body 4, a plurality of outflow ducts are formed parallel to the through-bore 49 and arranged coaxially in the circumferential direction, FIG. 1 showing only one of said coaxial ducts, which is characterized by the reference symbol 47. In addition, a bypass duct 52 for equalizing the pressure between the outflow duct 47 in the valve body 4 and the armature 2 in the housing 40 is formed in the valve body 4. A ball 48 closes off an end of the through-bore 49 which faces away from the valve element 3. The end of the through-bore 49 which faces the valve member 3 forms a through-opening 5 in the valve body 4 and has a valve seat 6. One end of part 10 of the valve element 3 bears against the valve seat 6 and, in the de-energized operating state of the solenoid valve 1, said end closes off the through-opening 5 and, when the solenoid valve 1 is actuated, said end lifts off from the valve seat 6 and reopens said through-opening. The part 10 of the valve member 3 is guided in a movable fashion through an opening 9 in a baffle device 8, wherein the baffle device 8 is secured in the valve body 4. An annular gap 23, with a relatively large gap width for unimpeded movement of the valve member 3, is provided between the baffle device 8 and the part 10. The baffle device 8 causes the fluid flowing in through the through-opening 5 to be deflected by 180° in the direction of the outflow duct 47. The solenoid valve 1 according to the disclosure also comprises a spring element 11 which is embodied as a spring washer and is arranged in the working gap 51, and an adjusting device 12 which is arranged on the armature 2 and is in contact with the spring element 11 in order to adjust a spring force of the spring element 11.

Figure 2:
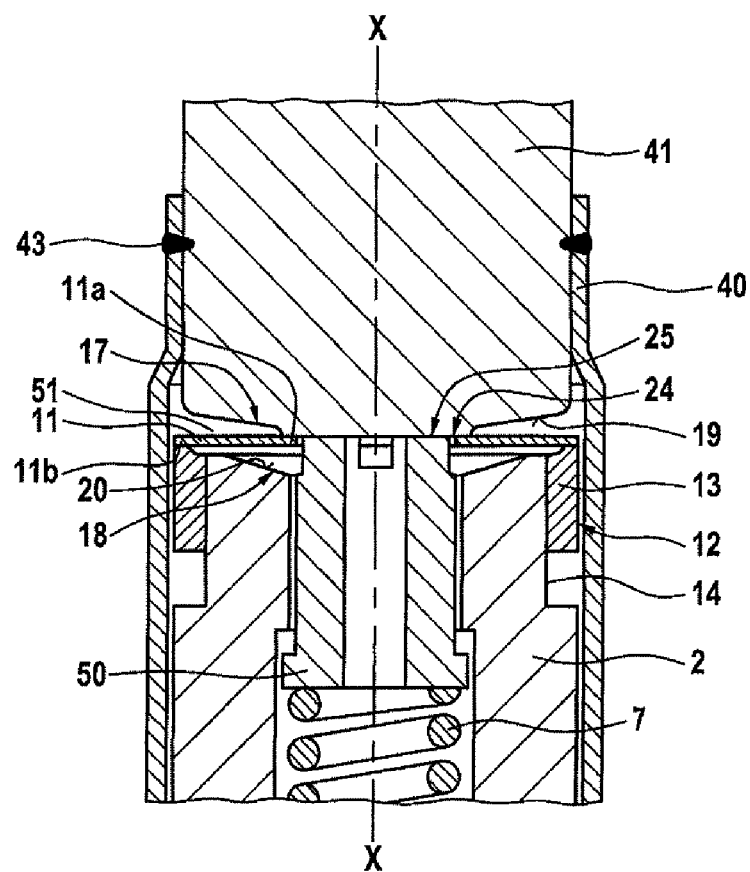
FIG. 2 is an enlarged sectional illustration of part of the solenoid valve in FIG. 1.

As is apparent from FIG. 2, the spring element 11 has here a central opening 24 into which an end region 25 of the pressure element 50 is inserted. The end region 25 is in contact with the pole core 41. The spring element 11 bears with an internal circumference 11a on an end side 17, facing the armature 2, of the pole core 41 and with an external circumference 11b on the adjusting device 12. In this first exemplary embodiment, the adjusting device 12 is embodied as a circumferential adjusting ring 13 which is arranged in an armature annular groove 14 and is secured to an armature 2 by means of a form fit. By displacing and positioning the adjusting ring 13 in the armature annular groove 14, the spring force of the spring element 11 is set during the mounting of the solenoid valve 1 before the insertion into the housing 40. As is also apparent from FIG. 2, that end side 17 of the pole core 41 which faces the armature 2 has a first undercut 19, and an end side 18, facing the pole core 41, of the armature 2 has a second undercut 20. The two undercuts 19, 20 are each of tapered design. The first and second undercuts 19, 20 make available a free space or deformation space for the spring element 11, the external circumference 11b of which spring element 11 is pressed or deformed coaxially with respect to the central axis X in the direction of the pole core 41 when the solenoid valve 1 is actuated. The specific bearing points of the spring element 11 result in a desired, slightly progressive spring characteristic curve which the effect of closing the valve. Together with the linear spring force characteristic curve of the return element 7, the characteristic curve of the spring element 11 which is switched in parallel results in an overall progressive spring characteristic curve which counteracts the progressive magnetic force profile and the continuous (proportional) adjustability of the solenoid valve is considerably improved.

Figure 3:
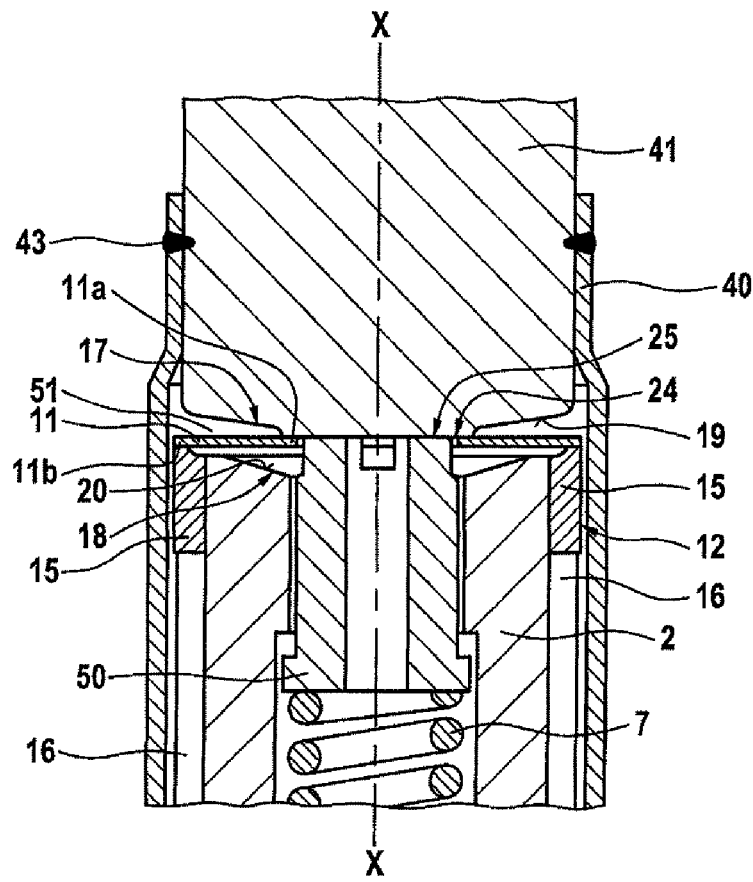
FIG. 3 is a sectional illustration of part of the solenoid valve according to a second exemplary embodiment of the disclosure.

FIG. 3 shows an enlarged sectional illustration of part of the solenoid valve 1 according to a second exemplary embodiment, wherein identical or functionally identical components are denoted by the same reference symbols as in the first exemplary embodiment. In this second exemplary embodiment, the adjusting device 12 comprises a plurality of adjusting elements 15, which are arranged in a plurality of recesses 16 in the armature 2, wherein in this sectional illustration only two adjusting elements 15 and two recesses 16 can be seen. The recesses 16 are embodied as armature longitudinal grooves which run over the entire axial length of the armature 2. The individual adjusting elements 15 are connected to one another by means of a circumferential ring connection (not shown) which applies a clamping force and secures the adjusting elements 15 to the armature 2. With this mounting of the solenoid valve 1, the adjusting elements 15 are displaced and positioned to an equal extent, and the spring force of the spring element 11 is thereby set. By virtue of the fact that the spring element 11 bears on the plurality of individual adjusting elements 15, dimensional deviations or fabrication tolerances, for example in the thickness and evenness, as well as remaining burrs from the manufacturing process, are largely compensated.

The solenoid valve 1 according to the disclosure in the two described exemplary embodiments has the advantage that as a result of the displaceable and therefore adjustable adjusting device 12 it is possible to adjust the spring force of the spring element 11 in its interaction with the return element 7 and the pressure element 50 during the mounting. As a result of the adjustment of the spring force of the spring element 11 which has a closing effect it is therefore possible to counteract, during the actuation of the solenoid valve 1, the magnetic force which increases exponentially as the axial working gap 51 becomes smaller. As a result, the adjustability of the solenoid valve 1 is considerably improved and better functional precision is implemented at all operating points. Furthermore, a similar and largely corresponding functional characteristic or a small batch variation is achieved during the fabrication of the solenoid valves.

What is claimed is:

1. A solenoid valve for controlling a fluid, comprising
an armature,
a pole core positioned in relation to the armature so that a working gap is provided between the armature and the pole core,
a valve member which is connected to the armature and is movable together with the armature,
a valve body with a through-opening on which a valve seat is formed, wherein the valve member is configured to open and close the through-opening on the valve seat, a return element which is configured to apply a return force to the valve member in order to return the valve member to a closed state, a spring element which is arranged in the working gap, and an adjusting device which is arranged on the armature and which is in contact with the spring element in order to adjust a spring force of the spring element.

2. The solenoid valve according to claim 1, wherein the adjusting device comprises a circumferential adjusting ring which is arranged in an armature annular groove.

3. The solenoid valve according to claim 1, wherein the adjusting device comprises a plurality of individual adjusting elements which are arranged in recesses in the armature.

4. The solenoid valve according to claim 3, wherein the recesses are configured as longitudinal grooves.

5. The solenoid valve according to claim 4, wherein the longitudinal grooves extend over the entire axial length of the armature.

6. The solenoid valve according to claim 1, wherein a form fit is provided between the adjusting device and the armature.

7. The solenoid valve according to claim 1, wherein the spring element has a central opening and bears with an internal circumference on an end side, facing the armature of the pole core.

8. The solenoid valve according to claim 1, wherein the spring element bears with an external circumference on the adjusting device.

9. The solenoid valve according to claim 1, wherein an end side of the pole core which faces the armature has a first undercut.

10. The solenoid valve according to clam 9, wherein an end side of the armature which faces the pole core has a second undercut.

* * * * *